(12) United States Patent
Batt-Rawden et al.

(10) Patent No.: US 12,370,586 B2
(45) Date of Patent: Jul. 29, 2025

(54) TREATMENT OF HYDROCARBON-CONTAMINATED MATERIALS

(71) Applicant: ENVOREM LIMITED, London (GB)

(72) Inventors: Mark Batt-Rawden, Woking (GB); Michael Levey, Westhill (GB)

( * ) Notice: Subject to any disclaimer, the term of this patent is extended or adjusted under 35 U.S.C. 154(b) by 48 days.

(21) Appl. No.: 17/776,304

(22) PCT Filed: Nov. 12, 2020

(86) PCT No.: PCT/EP2020/081980
§ 371 (c)(1),
(2) Date: May 12, 2022

(87) PCT Pub. No.: WO2021/094497
PCT Pub. Date: May 20, 2021

(65) Prior Publication Data
US 2022/0403250 A1 Dec. 22, 2022

(30) Foreign Application Priority Data
Nov. 12, 2019 (GB) ..................... 1916428

(51) Int. Cl.
*C02F 11/15* (2019.01)
*B01D 17/02* (2006.01)
(Continued)

(52) U.S. Cl.
CPC .......... *C02F 11/15* (2019.01); *B01D 17/0205* (2013.01); *B01D 17/044* (2013.01);
(Continued)

(58) Field of Classification Search
CPC ............. B01D 17/0205; B01D 17/044; B01D 17/045; B01D 17/047; B01D 17/048;
(Continued)

(56) References Cited

U.S. PATENT DOCUMENTS

2006/0180353 A1* 8/2006 Smith ................... E21B 21/063
166/267
2008/0156709 A1 7/2008 Johnson
(Continued)

OTHER PUBLICATIONS

International Search Report in corresponding PCT application No. PCT/EP2020/081980, Mar. 12, 2021, 3 pp.
(Continued)

*Primary Examiner* — Renee Robinson
(74) *Attorney, Agent, or Firm* — Tredecim LLC; Sean L. Sweeney (57) ABSTRACT

A method of treating contaminated materials such as oil and gas production waste sludges to recover crude oil hydrocarbons. The method includes the inversion of water-in-oil emulsions, and subsequent separation steps. These may involve the separation and removal of asphaltenes, petroleum waxes and/or solid particles from the crude oil hydrocarbons. The treatment method uses the physical phenomena of hydrodynamic cavitation and hydraulic shock, which produce different effects upon a mixture of water and the contaminated material being treated. These are deployed either as single or combined stage(s) of treatment or as a repeated series of single/combined treatment stages, with or without additional processing operations between each single/combined treatment stage. The method may be implemented with suitable plant including hydrodynamic cavitation units (103, 106) and hydraulic shock units (104, 107), followed by separators (105, 108).

8 Claims, 3 Drawing Sheets

(51) Int. Cl.
- *B01D 17/04* (2006.01)
- *B01D 17/06* (2006.01)
- *B01D 21/26* (2006.01)
- *B09C 1/02* (2006.01)
- *C10G 1/04* (2006.01)

(52) U.S. Cl.
CPC ......... *B01D 17/045* (2013.01); *B01D 17/047* (2013.01); *B01D 17/06* (2013.01); *B01D 21/262* (2013.01); *B01D 21/267* (2013.01); *B09C 1/02* (2013.01); *C10G 1/045* (2013.01); *C10G 1/047* (2013.01); *C10G 2300/1003* (2013.01)

(58) Field of Classification Search
CPC ....... B01D 17/06; B09C 1/02; C02F 1/34–36; C02F 1/48; C02F 11/00; C02F 11/006; C02F 11/15

See application file for complete search history.

(56) References Cited

U.S. PATENT DOCUMENTS

| | | |
|---|---|---|
| 2011/0278218 A1* | 11/2011 | Dionne .................. B01D 17/04 210/523 |
| 2012/0228220 A1 | 9/2012 | Johnson |
| 2016/0045841 A1 | 2/2016 | Kaplan et al. |
| 2019/0330082 A1 | 10/2019 | Cioanta et al. |

OTHER PUBLICATIONS

Written Opinion in corresponding PCT application No. PCT/EP2020/081980, Mar. 12, 2021, 4 pp.

* cited by examiner

TREATMENT OF HYDROCARBON-CONTAMINATED MATERIALS

This invention relates to the treatment of hydrocarbon-contaminated materials. It is particularly directed to the treatment of sludge materials where the hydrocarbon-contamination comes from crude oil extraction or similar oil recovery processes and where the quantities of contaminated material are very substantial, as well as being difficult to treat, so they are often simply left. This can lead to a variety of environmental problems and there is a substantial need for effective remediation processes to deal with such contaminated materials, in particular "oily sludge". While oily sludge is a major component of the hydrocarbon-contaminated materials which are susceptible to treatment, the consistency of the material requiring the treatment may vary from a relatively mobile liquid through to increasingly viscous heavy liquids and sludges and finally through to materials which may require some pre-treatment to bring them into a state where they can be processed in accordance with the teachings of the present invention. The present invention may be applied to cleaning/remediating hydrocarbon contaminated sand and soils. This contamination can arise either from production waste discharge/disposal to the environment (hydrocarbon containing produced water, hydraulic fracturing flowback water, oil and gas production, refining and transportation waste sludge disposal), and from accidental/deliberate hydrocarbon/oil spills from pipelines, tanks, tankers, wellhead blowouts, etc.

BACKGROUND

An estimated 70-125 million tonnes (500-900 million barrels) of oily sludges are produced each year during the extraction and separation of crude oil from co-produced water, the transportation and processing of crude oil, and from the use of heavy fuel oils. Historically most of these oily sludges have been dumped into waste pits, in the desert or other surroundings, with a small fraction being incinerated.

Production and tank bottom oily sludges typically contain 15-40% by weight of a mixture of paraffinic and aromatic hydrocarbons of varying molecular weights as water-in-oil emulsions, as well as clays and other inorganic and organic particles, microbiological materials, asphaltenes, waxes and various chemicals that are added during extraction, transportation and production. The treatment and recovery of crude oil hydrocarbons from these oily sludges will increase the total volumes of crude oil extracted from wells, thereby giving improved production, profitability and return on asset investments, in addition to reducing the quantities of production waste materials that have to be managed, stored, disposed of, or remediated at a later date.

There are a number of important, sizeable markets worldwide for systems that are able to process and recover hydrocarbons from oil and gas production waste sludges in a cost-effective and environmentally sound manner. The figures below exclude the potential market value of oils recovered from the considerable historic accumulations of other oily sludges that exist throughout the world, estimated to be anywhere between 2 and 5 billion tonnes in tanks, lagoons and buried/landfilled. The following table illustrates this:

| Source of oily sludges | Global annual volume of oily sludge production (tonnes) | Crude oil content of sludges | Crude oil recoverable (90-95%) from sludges (tonnes) |
|---|---|---|---|
| Crude oil extraction and transportation [1] | 46-93 million | 15-40% (average ~20-25%) | 4-19 million |
| Oil refining [2] | 21 million | 15-40% (average ~20-25%) | ~4 million |
| Annual totals[3] | 65-114 million | | 8-23 million |

Notes to the table above:

[1] Crude oil extraction and transportation production - according to the IEA Oil Market Report for 2016, World Oil consumption was almost 35 billion barrels for the year. During extraction and transportation 1-2% of crude oil may be lost from production as tank bottom and other sludge deposits, with lower molecular weight crude oils comprising typically 15-40% of this total loss.
[2] Refineries - currently there are approximately 700 large oil refineries operating worldwide, with 139 currently operating in the USA and, according to the US Environmental Protection Agency, each oil refinery produces an average of 30,000 tonnes of oily sludge waste per year, so the total each year is approximately 21 million tonnes of oily sludges, with recoverable light oil fractions of 15-40%.
[3] Historic accumulations of oily sludges - these figures exclude the considerable historic accumulations of oily sludges that exist throughout the world, estimates varying from 2 to 5 billion tonnes in tanks, lagoons and buried/landfilled. Depending upon their ages, these historic accumulations typically contain 10-15% of recoverable oils, i.e. 200-750 million tonnes.

DESCRIPTION OF THE INVENTION

The present invention is for a system that simultaneously generates and harnesses a number of physical phenomena in water in sequence to demulsify, invert water-in-oil/hydrocarbon emulsions, detach, separate, remove, and, recover the majority of free and/or adhering crude oil hydrocarbons from sludges arising from oil and gas production, including asphaltenes, waxes, as well as other hydrocarbon contaminated materials and wastes. Such hydrocarbon contamination of materials and wastes may be complex in nature, consisting of mixtures of fresh, aged and/or weathered and/or oxidised hydrocarbons in varying proportions mixed with other materials and/or water, with viscosities at local ambient temperatures varying from free-flowing low viscosity liquids to very high viscosity tars and solids According to the present invention, there is provided a method of treating oil and gas production waste sludges and similar contaminated materials to recover crude oil hydrocarbons. The method includes the inversion of water-in-oil emulsions, and subsequent separation steps. These may involve the separation and removal of asphaltenes, petroleum waxes and/or solid particles from the crude oil hydrocarbons. The treatment method of the present invention relies for its efficacy upon the physical phenomena of hydrodynamic cavitation and hydraulic shock, which produce different effects upon material being treated, and which are deployed either as single or combined stage(s) of treatment or as a repeated series of single/combined treatment stages, with or without additional processing operations between each single/combined treatment stage.

The method of treatment of the present invention may be carried out using purpose-built plant including one or more hydrodynamic cavitation units, one or more hydraulic shock units, and an appropriate number of separators of appropriate types to handle the treated mixture and enable its separation into its different components. The number, type and arrangement of such units will be tailored to the particular type of contaminated material to be handled, and will often be purpose-built for use in a particular case, for example remediation of oily sludge contaminated sands, processing of tank bottom sludges, treatment of the content of waste oily sludge-containing lagoons.

The two physical phenomena, hydrodynamic cavitation and hydraulic shock, which produce different effects on the material being treated, may be generally described as follows:

Hydrodynamic Cavitation

Hydrodynamic cavitation produces significant energy releases and violent shock waves in liquid-based mixed materials which occurs when micro-vapour bubbles are created in regions of very low pressure of a flowing liquid move into regions of higher pressure, when they collapse into remnant clouds of much smaller, micro-vapour bubbles. There are even greater energy releases and shockwave production when these remnant clouds of much smaller micro-vapour bubbles collapse in turn. The energies released at the vapour/liquid interfaces by the collapse of these micro-vapour bubbles can raise localised temperatures to 5,000K or higher across distances of a few nanometres, sufficient to vaporise hydrocarbons and even metals. The micro-vapour bubble collapse produces micro-jets with velocities of up to 3,000 metres per second or higher and localised high amplitude shock waves that exert pressures of between 1 and 10 Gigapascals against on nearby surfaces, inducing substantial localised stresses, which results in the dislodgement of hydrocarbons and other materials lodged on the surfaces of particles. The detached/separated/vaporised hydrocarbons are dispersed into the process water. Hydrodynamic cavitation may be generated when carrying out the treatment process according to the present invention by pumping water at pressures of 10 to 50 bar through orifices with the appropriate internal profiles that are between 5 and 50 millimetres in diameter and discharge into venturis or other tubes with diameters greater than those of the orifices, with or without reduced diameters at or near their inlets. In some embodiments of the plant used to carry out the process of the present invention the quantities and effects of hydrodynamic cavitation are enhanced by arranging two orifices or the venturis or other tubes so that they are diametrically opposed to each other and at a distance apart, so the emergent water flows collide, whilst in others the quantities and effects of hydrodynamic cavitation may be enhanced by arranging three or more orifices or the venturis or other tubes such that the emergent water flows arrive a single point and collide.

Alternatively to, or in addition to, the above method of generating hydrodynamic cavitation, hydrodynamic cavitation may be generated when carrying out the process of the present invention by pumping water at pressures of between 30 bar and 1,000 bar, preferably at least 100 bar, through one or more specially designed nozzles with diameters between 0.1 millimetre and 10 millimetres directed into a tube either tangentially or at inclined angles to the direction of flow, through which the water transporting hydrocarbon contaminated particles is flowing and is at a pressure of between 0.1 bar and 50 bar, preferably between 0.5 and 25 bar.

Hydraulic Shock

The continuous, pulsed or periodic release of water pumped at very high pressures, and/or highly compressed insoluble/slightly soluble gas(es), into a much lower pressure flow of water, applies hydraulic shock this lower pressure flow of water, as well as any solids being transported in the water flow. This hydraulic shock continuously transfers kinetic energy and momentum from the very high-pressure flow of water or release of compressed gas to the lower pressure flow of water which results in acceleration of its flow and the production and propagation of high velocity shockwaves through the water much faster than its flow. The propagation of these shockwaves through the water produces rapid variations in pressure, which induce rapid changes in the linear and angular velocities, linear and angular momenta, and linear and angular kinetic energies, of particles suspended in and transported by the flow of water, causing particles to collide. The direct of effect of the pressure variations produced by shockwaves and the collisions the detachment and separation of adhering hydrocarbons and other materials from particle surfaces and become dispersed through the process water. Hydraulic shock may be created when carrying out the process of the present invention by pumping water at pressures of between 50 bar and 1,000 bar through one or more specially designed nozzles with diameters between 0.1 millimetre and 10 millimetres directed into a tube either tangentially or at inclined angles to the direction of flow, through which the water transporting hydrocarbon contaminated particles is flowing and is at a pressure of between 0.1 bar and 50 bar.

In the treatment process according to the present invention, the use of hydrodynamic cavitation and hydraulic shock, also causes large numbers of collisions between particles transported in suspension in the process water, with the consequent detachment of surface materials and adhering hydrocarbons, essentially by a process of attrition.

The process of the present invention thus generates and harnesses the physical phenomena referred to above, to produce a discharge of water carrying particles, detached/separated hydrocarbons, asphaltenes and waxes, which is then fed into a separator. The separator may use one or more of upward currents, longitudinal travel times or differences in angular momentum, whether unassisted (cyclonic separator) or assisted (centrifugal separator) to achieve separation and recovery of particles and hydrocarbons from the process water. The process water and detached/separated hydrocarbons overflow from the top/upper section of the upward current separator, cyclonic separator, or are discharged by the centrifugal separator into an oil coalescer-separator, where the crude oil hydrocarbons are separated from the process water and transferred into a recovered crude oil tank.

In practising the present invention to treat oily sludges in order to detach/separate and recover the crude oil hydrocarbons from such materials, water carrying particles and detached/separated hydrocarbons is preferably discharged into the separator via a venturi or venturis submersed within the separator to facilitate rapid mixing of the inflow with the water already in the separator. Heavier and/or more dense particles are separated and removed from the bottom of the separator or, where a centrifugal separator is utilised, discharged by the centrifugal separator, whilst the water, detached/separated hydrocarbons and fine/lighter/less dense particles may then be discharged into one or more oil-water separators for removal/recovery of the hydrocarbons. The separator preferably includes one or more arrangements of laminar/formed plates, tubes or similar structures to alter the horizontal and/or vertical and/or angular flows of water in order to improve the rates of coalescence of hydrocarbons and the separation of the particles and the coalesced hydrocarbons from the water. In some embodiments of the present invention, the rates of coalescence and recovery of dispersed hydrocarbons is increased by making some or all of the laminar or formed plates, tubes or similar structures from conducting materials and/or metals, such as aluminium, iron, titanium, graphite and/or stainless steels that are electrically connected and have a suitable direct electric current, time reversed electric current or alternating electric current passed between them, such that the electrochemistry introduced enhances the effectiveness of coalescence and recovery. In some other embodiments of the present invention, air, nitrogen and/or inert or other gases are introduced into the separator as micro-bubbles, ultrafine bubbles and/or nano-bubbles to enhance the effectiveness of coalescence and recovery.

In practising the present invention, heavier/more dense particles removed from separators and/or oil coalescers may be subjected to one or more further stages of treatment, which generate and harness the same physical phenomena.

In some cases, following recovery from the separator in the second stage of treatment, heavier/more dense particles may be separated into different fractions depending upon their sizes and/or densities using an upward current separator or separators, and/or vibrating screens with appropriately selected mesh sizes and/or dewatered or partially dewatered using a vibrating screen and/or conveyor, where the water is recovered and used with/without treatment for reuse in the system.

In cases where the oily sludges contain a high proportion of asphaltenes, petroleum waxes and/or similar high molecular weight hydrocarbons, whether or not aged and/or weathered and/or oxidised, these are preferably separated from heavier/more dense particles using one or a sequence of separators, which may be either upward current separators with rising water currents and/or the introduction of water that has been supersaturated with dissolved air or gases and/or the introduction of air or other gas bubbles via diffusers, and/or other separators utilising the principles of hydrocyclones or centrifuges.

When carrying out the process of the present invention, the temperature of the process water may be raised above ambient to improve the rates of emulsion inversion, removal and/or recovery of crude oil and other hydrocarbons, including those of higher molecular weight and/or oxidised, for reuse, processing or reprocessing.

A further preferable variation when carrying out the process of the present invention is to dissolve one or more ionic salts, comprising wholly or mainly of sodium chloride, potassium chloride, sodium carbonate, potassium carbonate, sodium hydrogen carbonate, potassium hydrogen carbonate, sodium hydroxide or potassium hydroxide, or a combination thereof, into the process water in order to increase the rates of coalescence of the hydrocarbons that are dispersed through the process water following their separation in the oily sludges.

Alternatively, as a preferable variation, the process can be carried out using produced water, brackish or seawater, after the water has been suitably filtered and/or processed using hydrocyclones to remove the majority of suspended particles, since these sources of water already contain dissolved ionic salts, which will increase the rates of coalescence of the hydrocarbons that are dispersed through the process water following their separation in the oily sludges.

In a further preferable variation, the process water is discharged to an existing produced water treatment facility or transported via a pipeline or tanker for injection into a disposal reservoir or to another waste management facility for treatment and/or disposal.

In an alternative variation, the process water may be treated after removal/recovery of the detached/separated hydrocarbons prior to reuse or discharge to the local environment using the addition of chemical coagulants and/or flocculants, and/or one or more stages of physical and/or electrochemical treatment. This may include the simultaneous application of one or more electrochemical processes, such as electrooxidation, electroreduction, electroprecipitation, electrodemulsification, electrocoagulation and electroflocculation, dissolved air flotation/sedimentation, and/or media filtration, and/or membrane filtration (microfiltration and/or ultrafiltration and/or nanofiltration and/or reverse osmosis) and/or chemical oxidation using one or more peroxygen release agents (including but not limited to: hydrogen peroxide, sodium peroxide, magnesium peroxide, calcium peroxide, sodium persulphate, and peroxymonosulphuric acid and/or its precursors) with/without one or more oxidation and/or oxygen release catalysts, and/or biological treatment processes may be used to treat the water prior to discharge to the environment. Plasma oxidation or a supercritical oxidation process or processes are used to treat the water prior to discharge to the environment.

In practising the present invention, following recovery from the separators in the second stage of treatment, heavier/more dense particles may be separated into different fractions depending upon their sizes and/or densities using an upward current separator or separators, and/or vibrating screens with appropriately selected mesh sizes and/or dewatered or partially dewatered using a vibrating screen and/or inclined conveyor, where the water is recovered and used with or without treatment for reuse in the system.

In practising the present invention, any dewatered or partially dewatered particles discharged from the treatment process that are substantially free of contamination may be discharged via conveyors or other transfer systems directly into stockpiles or skips, or are fed into one or more mixers, which blend the dewatered or partially dewatered particles with a suitable formulation of concrete and/or other materials to stabilise heavy metals and/or radionuclides that may be present in order to prevent such heavy metals and/or radionuclides from leaching out during long-term storage and creating environmental and/or other hazards. Dewatered or partially dewatered particles discharged from the treatment process that still contain concentrations of hydrocarbons that are unsuitable for disposal may be further treated.

In a preferable variation of the present invention, the treatment system is built as transportable modules, which may include amongst other configurations being built into ISO standard shipping containers and frames of varying dimensions. These transportable modules may be moved between different sites where it is required to treat and recover crude oil hydrocarbons from production waste sludges and tank bottom sludges.

In an alternative variation of the present invention, the treatment system is built in modules, which are permanently installed at a site where either oily sludges are produced from the separation of crude oil from its co-produced water or the transportation, storage and refining of crude oil, examples of such sites would include gathering stations or similar production facilities, crude storage tank farms, tanker loading/unloading terminals, and oil refineries, and/or oily sludges are received for treatment, having been transported by tanker, pipeline or other means. In order to carry out the process of the present invention, it is necessary to provide appropriate treatment plant which may be specifically constructed and adapted to a particular decontamination process. The various materials handling and other engineering components of the system may be sourced from available pumps, separators and cavitation generation units.

Figure 1:
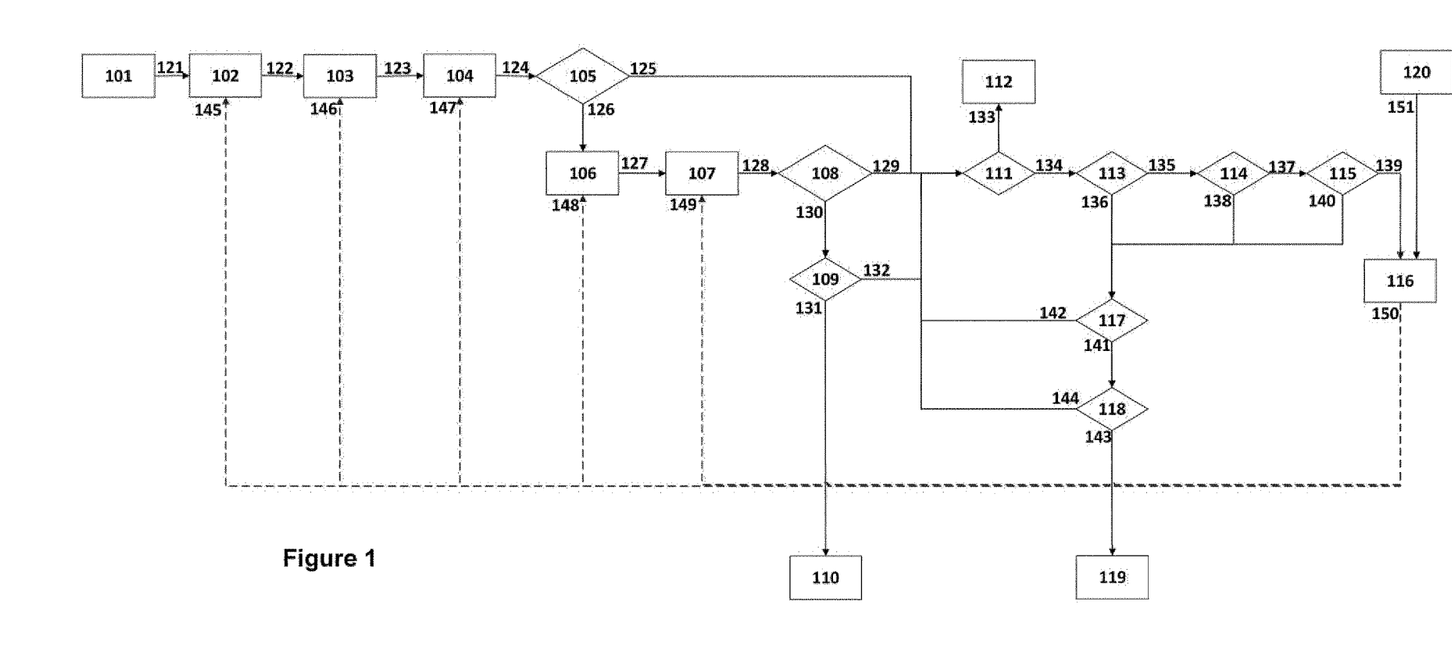
FIG. 1 is a process flow diagram for plant designed to treat weathered oil and gas production wastes as described in Example 1.
Figure 2:
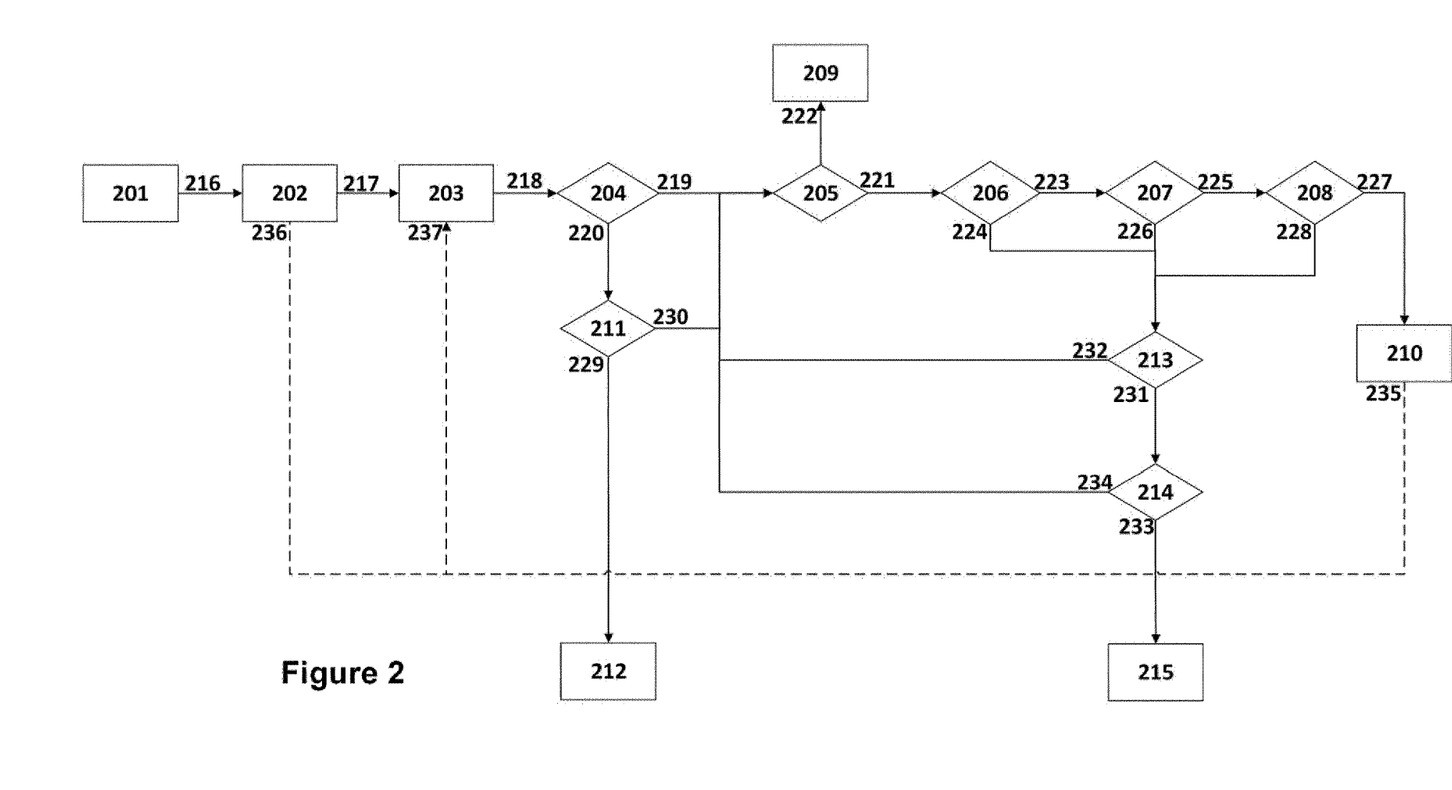
FIG. 2 is a process flow diagram for plant for treating tank bottom sludges as described in Example 2.
Figure 3:
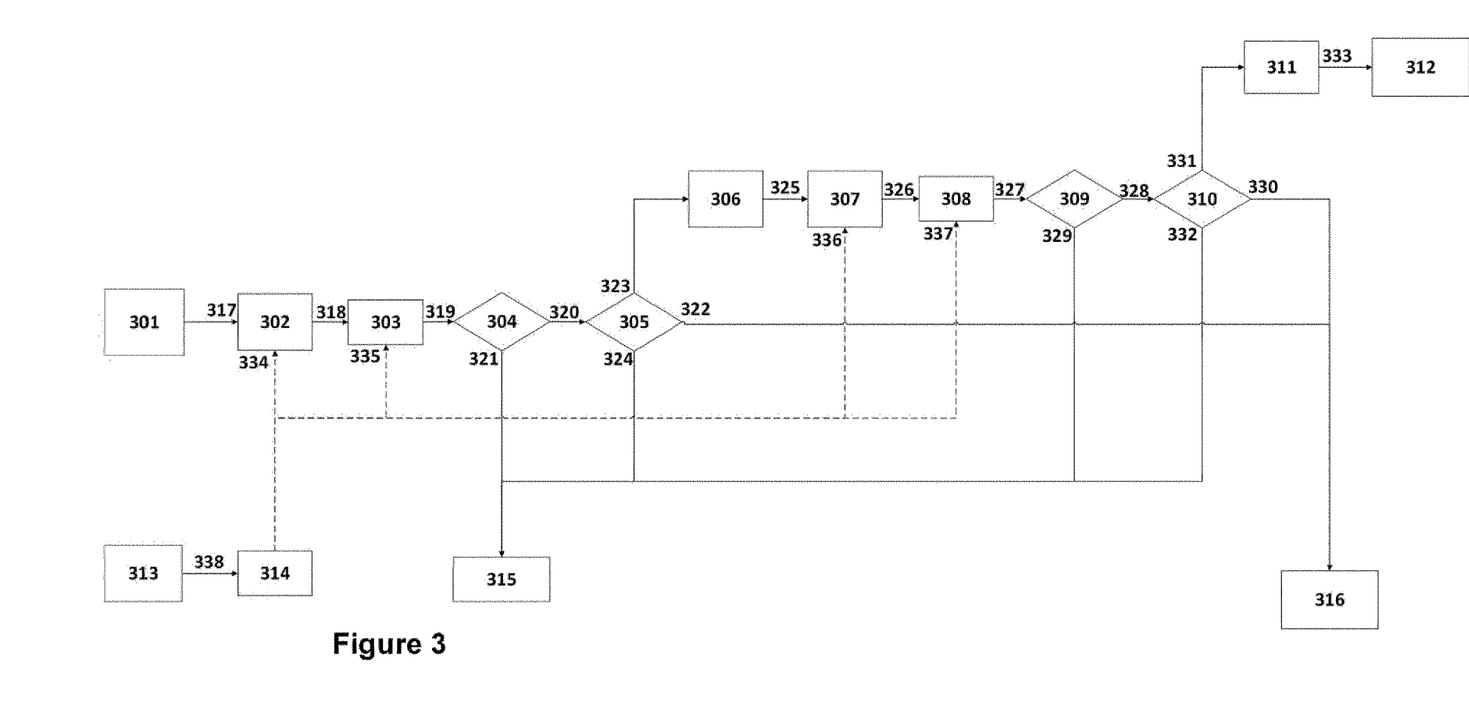
FIG. 3 is a process flow diagram for plant designed to treat oil and gas production waste sludges formed during the separation of crude oil from produced water that have been transferred from a separator to a collection/storage tank or other collection/storage facility as described in Example 3.

Three examples illustrating how the present invention may be put to use are set out below, and these should be read with reference to the corresponding accompanying drawings, showing diagrammatically the plant for carrying out the method of the respective example.

EXAMPLE 1

Weathered oil and gas production wastes, including hydrocarbon and crude oil contaminated sands and soils are introduced into a controlled hydrodynamic cavitation generation unit followed by a hydraulic shock unit, which are driven by high-pressure water pumps fed from reservoir tanks. For heavily oxidised production wastes 0.1% by weight of methyl oleate is added to the treatment system process water to facilitate the removal of the heavy, oxidised hydrocarbons from the particles.

The hydrodynamic cavitation generation unit ejects eject the water, separated hydrocarbons/oils and particles through a hydraulic shock unit into the lower section of an upward current separators which has controlled upward velocities to allow hydrocarbons/oils time to coalesce as they rise. The controlled upward velocities also act to classify the separated particles with dense particles and other particles typically greater than 100 microns in size settling downwards. The settled particles are removed from the bottom of the separators for disposal or returned back and fed into another hydrodynamic cavitation generation unit followed by hydrodynamic shock unit for a second stage of treatment.

The rates of hydrodynamic cavitation and hydraulic shock generation, and hence energy inputs, are adjusted such the hydrocarbons/oils are separated from the particles without disintegrating the particles.

The process water overflows from the upward current separators into an oil coalescer/separator. Hydrocarbons/oils are removed from the surface of the coalescer/separator using a skimmer and is transferred to storage tanks.

The process water that exits from the oil coalescer/separator is treated to a suitable standard for recycling within the system by an integrated water treatment system which includes dissolved air flotation/sedimentation and multiple stages of filtration.

Cleaned sand and soil particles discharged from the second upward current separator are dewatered prior to being discharged to a stockpile, with recovered being recycled to the oil coalescer/separator.

In detail, the operation of the plant for carrying out the process of this example is evident from the following key to the items shown in FIG. 1:

| | |
|---|---|
| 101 | Feedstock for treatment: weathered production wastes, hydrocarbon contaminated sands, soils, etc. |
| 102 | Feed hopper |
| 103 | First hydrodynamic cavitation generation unit |
| 104 | First hydraulic shock generation unit |
| 105 | First upward current separator |
| 106 | Second hydrodynamic cavitation generation unit |
| 107 | Second hydraulic shock generation unit |
| 108 | Second upward current separator |
| 109 | Dewatering screw |
| 110 | Cleaned sand, soil, particulates |
| 111 | Oil coalescer/separator |
| 112 | Tank for recovered hydrocarbons/crude oil |
| 113 | Dissolved air flotation/sedimentation tank |
| 114 | Microfilters |
| 115 | Oleophobic ultrafilters |
| 116 | Process water tank |
| 117 | Thickener |
| 118 | Filter press |
| 119 | Dewatered flocs, sediments, etc. |
| 120 | Methyl oleate tank |
| 121 | Feed of weathered production wastes, hydrocarbon contaminated sands, soils, etc., (101) into feed hopper (102) |
| 122 | Discharge from feed hopper (102) into hydrodynamic cavitation generation unit (103) of weathered production wastes, hydrocarbon contaminated sands, soils, etc. |
| 123 | Discharge from hydrodynamic cavitation generation unit (103) into hydraulic shock unit (104) consisting of process water carrying separated hydrocarbons, solids/particulates, suspended ultrafine particulates |
| 124 | Discharge from hydraulic shock unit (104) into upward current separator (105) consisting of process water carrying separated hydrocarbons, solids/particulates, suspended ultrafine particulates |
| 125 | Overflow of process water carrying separated hydrocarbons, suspended ultrafine particulates from upward current separator (105) into inlet of oil coalescer/separator (111) |
| 126 | Discharge/transfer of settled solids/particulates from bottom of upward current separator (105) into hydrodynamic cavitation generator unit (106) |
| 127 | Discharge from hydrodynamic cavitation generator unit (106) into hydraulic shock unit (107) consisting of process water carrying separated hydrocarbons, solids/particulates, suspended ultrafine particulates |
| 128 | Discharge from hydraulic shock unit (107) into upward current separator (108) consisting of process water carrying separated hydrocarbons, solids/particulates, suspended ultrafine particulates |

| | |
|---|---|
| 129 | Overflow of process water carrying separated hydrocarbons, suspended ultrafine particulates from upward current separator (108) into inlet of oil coalescer/separator (111) |
| 130 | Discharge/transfer of settled solids/particulates from bottom of upward current separator (108) into dewatering screw (109) |
| 131 | Discharge of cleaned sand, soil and particulates into stockpile (110) |
| 132 | Transfer of process water carrying separated hydrocarbons, suspended ultrafine particulates from dewatering screw (109) into inlet of oil coalescer/separator (111) |
| 133 | Transfer of recovered hydrocarbons/oils from oil coalescer/separator (111) into tank for recovered hydrocarbons/crude oil (112) |
| 134 | Outflow of process water carrying suspended ultrafine particulates, remaining dispersed/emulsified hydrocarbons, asphaltenes, petroleum waxes, etc., from oil coalescer/separator (111) into dissolved air flotation/sedimentation unit (113) |
| 135 | Transfer of treated process water from dissolved air flotation/sedimentation unit (113) to microfilters (114) |
| 136 | Transfer of flocs and sediments from dissolved air flotation/sedimentation unit (113) to thickener tank (117) |
| 137 | Transfer of treated process water from microfilters (114) to oleophobic ultrafilters (115) |
| 138 | Backwash from microfilters (114) to thickener tank (117) |
| 139 | Transfer of filtered process water from oleophobic ultrafilters (115) to process water storage tank (116) |
| 140 | Backwash from oleophobic ultrafilters (115) to thickener tank (117) |
| 141 | Transfer of thickened flocs, sediments, etc., from bottom of thickener tank (117) to filter press (118) |
| 142 | Transfer of supernatant liquid from thickener tank (117) to inlet of oil coalescer/separator (111) |
| 143 | Discharge of dewatered flocs, sediments, etc., from filter press (118) to skip or stockpile |
| 144 | Transfer of filtrate liquid from filter press (118) to inlet of oil coalescer/separator (111) |
| 145 | Process water feed to feed hopper (102) wash down jets |
| 146 | Process water feed to hydrodynamic cavitation generation unit (103) |
| 147 | Process water feed to hydraulic shock unit (104) |
| 148 | Process water feed to hydrodynamic cavitation generation unit (106) |
| 149 | Process water feed to hydraulic shock unit (107) |
| 150 | Treated process water feed for reuse within the system |
| 151 | Methyl oleate feed from methyl oleate storage tank (120) to process water storage tank (116) |

EXAMPLE 2

Tank bottom and other sludges, including highly viscous, emulsified hydrocarbons, heavy oils and asphaltenes, are introduced into the controlled hydrodynamic cavitation generation unit, which is driven by a high-pressure water pump fed from process water storage tank.

The hydrodynamic cavitation generation unit ejects eject the water, separated hydrocarbons/oils and particles through a hydraulic shock unit into the lower section of an upward current separators which has controlled upward velocities to allow hydrocarbons/oils time to coalesce as they rise. The controlled upward velocities also act to classify the separated particles with dense particles and other particles typically greater than 100 microns in size settling downwards. The settled particles are removed from the bottom of the upward current separator for disposal after dewatering using a vibrating screen with a final mesh aperture size of 75 microns.

The rates of hydrodynamic cavitation and hydraulic shock generation, and hence energy inputs, are adjusted such the hydrocarbons/oils are separated from the particles and water-in-oil emulsions are inverted and the hydrocarbons are separated and dispersed into the process water.

The process water overflows from the upward current separator into an oil coalescer/separator. Hydrocarbons/oils are removed from the surface of the coalescer/separator using a skimmer and is transferred to a storage tank.

The process water that exits from the oil coalescer/separator is treated to a suitable standard for recycling within the system by an integrated water treatment system which includes electrochemical water treatment to coagulate ultrafine suspended particulates, including petroleum waxes and asphaltenes, dissolved air flotation/sedimentation, multimedia filtration. Flocs and sediments removed from the dissolved air flotation/sedimentation unit are thickened and dewatered using a screw press.

In detail, the operation of the plant for carrying out the process of this example is evident from the following key to the items shown in FIG. 2:

| | |
|---|---|
| 201 | Feedstock for treatment: tank bottom and production waste sludges |
| 202 | Hydrodynamic cavitation generation unit |
| 203 | Hydraulic shock generation unit |
| 204 | Upward current separator |
| 205 | Oil coalescer/separator |
| 206 | Electrochemical water treatment unit |
| 207 | Dissolved air flotation/sedimentation tank |
| 208 | Multimedia filter |
| 209 | Tank for recovered hydrocarbons/crude oil |

-continued

| | |
|---|---|
| 210 | Process water tank |
| 211 | Vibrating screen for dewatering |
| 212 | Cleaned sand, soil, particulates |
| 213 | Thickener tank |
| 214 | Screw press |
| 215 | Dewatered flocs, sediments, etc. |
| 216 | Feed of oil and gas production waste, tank bottom and pipeline sludges, etc., (201) into hydrodynamic cavitation generation unit (202) |
| 217 | Discharge from hydrodynamic cavitation generation unit (202) into hydraulic shock unit (203) consisting of process water carrying separated hydrocarbons, solids/particulates, suspended ultrafine particulates |
| 218 | Discharge from hydraulic shock unit (203) into upward current separator (204) consisting of process water carrying separated hydrocarbons, solids/particulates, suspended ultrafine particulates |
| 219 | Overflow of process water carrying separated hydrocarbons, suspended ultrafine particulates from upward current separator (204) into inlet of oil coalescer/separator (205) |
| 220 | Discharge/transfer of settled solids/particulates from bottom of upward current separator (204) to vibrating screen (211) for dewatering |
| 221 | Outflow of process water carrying suspended ultrafine particulates, remaining dispersed/emulsified hydrocarbons, asphaltenes, petroleum waxes, etc., from oil coalescer/separator (205) into electrochemical water treatment unit (206) |
| 222 | Transfer of recover hydrocarbons/oils from oil coalescer/separator (205) into tank for recovered hydrocarbons/crude oil (209) |
| 223 | Outflow of process water carrying coagulated ultrafine particulates, demulsified hydrocarbons, asphaltenes, petroleum waxes, etc., from electrochemical water treatment unit (206) into dissolved air flotation/sedimentation unit (207) |
| 224 | Backwash from electrochemical water treatment unit (206) to thickener tank (213) |
| 225 | Transfer of treated process water from dissolved air flotation/sedimentation unit (207) to multimedia filters (208) |
| 226 | Transfer of flocs and sediments from dissolved air flotation/sedimentation unit (207) to thickener tank (213) |
| 227 | Transfer of filtered process water from multimedia filters (208) to process water storage tank (210) |
| 228 | Backwash from multimedia filters (208) to thickener tank (213) |
| 229 | Discharge of cleaned sand and particulates from vibrating screen (211) into stockpile or skips (212) |
| 230 | Transfer of process water carrying separated hydrocarbons, suspended ultrafine particulates from vibrating screen (211) into inlet of oil coalescer/separator (205) |
| 231 | Transfer of thickened flocs, sediments, etc., from bottom of thickener tank (213) to screw press (214) |
| 232 | Transfer of supernatant liquid from thickener tank (213) to inlet of oil coalescer/separator (205) |
| 233 | Transfer of dewatered flocs, sediments, etc., from screw press (214) to skip (215) |
| 234 | Transfer of filtrate liquid from screw press (214) to inlet of oil coalescer/separator (205) |
| 235 | Treated process water feed for reuse within the system |
| 236 | Process water feed to hydrodynamic cavitation generation unit (202) |
| 237 | Process water feed to hydraulic shock unit (203) |

EXAMPLE 3

Production waste sludges, including highly viscous, emulsified hydrocarbons, heavy oils, asphaltenes and petroleum waxes, that are formed, separate out and/or deposited in interceptors and separators where crude oil hydrocarbons are separated from their co-produced water are drawn into a controlled hydrodynamic cavitation generator, which is driven by a high-pressure water pump fed from the process water reservoir tank.

The hydrodynamic cavitation generator ejects the water, separated crude oil hydrocarbons, asphaltenes, petroleum waxes and particles through a controlled hydraulic shock generator into the lower section of an upward current separator, which has controlled upward water flow velocity to allow the separated crude hydrocarbons time to coalesce as they rise. The controlled upward velocities also act to classify the separated particles with dense particles and other particles typically greater than 100 microns in size, depending upon their relative densities, settling downwards. The rates of hydrodynamic cavitation generation and, hydraulic shock generation, and hence energy inputs, are adjusted maximise the rate and efficiency of water-in-oil emulsion inversion and separation and dispersion of asphaltenes, petroleum waxes into the process water.

The process water overflows into an oil coalescer-separator, where more crude oil hydrocarbons and solids are recovered/removed. Separated crude oil hydrocarbons are removed from the surface of the separators using oil skimmers and transferred into a recovered crude oil tank. The settled particles are removed from the bottom of the separators for disposal by injection into a disposal well. The used, contaminated process water that exits from the system is pumped for reinjection into a disposal well.

The crude hydrocarbons oil collected in the recovered crude oil tank is then treated using a second stage of hydrodynamic cavitation and hydraulic shock before being added back into the crude oil pipeline for transfer to the export terminal.

In detail, the operation of the plant for carrying out the process of this example is evident from the following key to the items shown in FIG. 3:

| | |
|---|---|
| 301 | Feedstock for treatment: oil and gas production waste sludges formed in API/CPI/IGF separators, etc. |
| 302 | First hydrodynamic cavitation generation unit |
| 303 | First hydraulic shock generation unit |
| 304 | First upward current separator |
| 305 | First oil coalescer/separator |
| 306 | Intermediate crude oil storage tank |
| 307 | Second hydrodynamic cavitation generation unit |
| 308 | Second hydraulic shock generation unit |
| 309 | Second upward current separator |
| 310 | Second coalescer/separator |
| 311 | Tank for recovered crude oil |
| 312 | Transfer of recovered crude oil to pipeline for export to terminal |
| 313 | Produced water, treated sewage, fresh/brackish/salt water from wells or surface water for use in process |
| 314 | Process water storage tank |
| 315 | Settled particulates and fines for disposal by reinjection |
| 316 | Used, contaminated process water contained suspended fines, asphaltenes, petroleum waxes, etc., for disposal by reinjection |
| 317 | Transfer of oil and gas production waste into hydrodynamic cavitation generation unit (302) |
| 318 | Discharge from hydrodynamic cavitation generation unit (302) into hydraulic shock unit (303) consisting of process water carrying separated crude oil, solids/particulates, suspended ultrafine particulates |
| 319 | Discharge from hydraulic shock unit (307) into upward current separator (304) consisting of process water carrying separated crude oil, solids/particulates, suspended ultrafine particulates |
| 320 | Overflow of process water carrying separated hydrocarbons, suspended ultrafine particulates from upward current separator (304) into inlet of oil coalescer/separator (305) |
| 321 | Discharge/transfer of settled solids/particulates from bottom of upward current separator (304) for disposal by reinjection (315) |
| 322 | Outflow of process water carrying suspended ultrafine particulates, remaining dispersed/emulsified hydrocarbons, asphaltenes, petroleum waxes, etc., from oil coalescer/separator (305) for reinjection (316) |
| 323 | Transfer of recovered crude oil and hydrocarbons containing particulates from oil coalescer/separator (305) to intermediate crude oil storage tank (306) |
| 324 | Discharge/transfer of settled solids/particulates from bottom of oil coalescer/separator (305) for disposal by reinjection (315) |
| 325 | Transfer of recovered crude oil and hydrocarbons containing particulates from intermediate crude oil storage tank (306) to hydrodynamic cavitation generation unit (307) |
| 326 | Discharge from hydrodynamic cavitation generation unit (307) into hydraulic shock unit (308) consisting of process water carrying separated crude oil and hydrocarbons, solids/particulates, suspended ultrafine particulates |
| 327 | Discharge from hydraulic shock unit (308) into upward current separator (309) consisting of process water carrying separated crude oil and hydrocarbons, solids/particulates, suspended ultrafine particulates |
| 328 | Overflow of process water carrying separated hydrocarbons, suspended ultrafine particulates from upward current separator (309) into inlet of oil coalescer/separator (310) |
| 329 | Discharge/transfer of settled solids/particulates from bottom of upward current separator (309) for disposal by reinjection (315) |
| 330 | Outflow of process water carrying suspended ultrafine particulates, remaining dispersed/emulsified hydrocarbons, asphaltenes, petroleum waxes, etc., from oil coalescer/separator (310) for reinjection (316) |
| 331 | Transfer of recovered crude oil from oil coalescer/separator (310) into tank for recovered hydrocarbons/crude oil (311) |
| 332 | Discharge/transfer of settled solids/particulates from bottom of oil coalescer/separator (310) for disposal by reinjection (315) |
| 333 | Transfer of recovered crude oil from recovered crude oil tank (312) for export to pipeline, etc. |
| 334 | Process water feed to hydrodynamic cavitation generation unit (302) |
| 335 | Process water feed to hydraulic shock unit (303) |
| 336 | Process water feed to hydrodynamic cavitation generation unit (307) |
| 337 | Process water feed to hydraulic shock unit (308) |
| 338 | Transfer of produced water, treated sewage, fresh/brackish/salt water from wells or surface water into process water tank (314) |

The invention claimed is:

1. A method of treating of hydrocarbon-contaminated materials in order to recover the hydrocarbon-based contaminants from such materials which comprises mixing the hydrocarbon-contaminated material with water, and subjecting the mixture to treatment and thereafter subjecting the mixture to one or more separation treatments to separate hydrocarbon-based contaminant material from the contaminated material, characterized in that process water is added to a feed of hydrocarbon-contaminated material to adjust the viscosity of the mixture upstream of at least one hydrodynamic cavitation treatment and at least one hydraulic shock treatment, in any sequential order, the at least one hydraulic shock treatment comprising continuous, pulsed or periodic release of water pumped into the mixture at high pressure relative to the pressure flow of the mixture or continuous, pulsed or periodic release of gas into the mixture where the gas is compressed to a high pressure relative to the flow of the mixture, the use of the at least one hydrodynamic cavitation treatment and the at least one hydraulic shock treatment being such as to cause collisions between particles transported in suspension in the process water, with the consequent detachment of surface materials and adhering hydrocarbons.

2. A method according to claim 1, wherein the separation step or steps are carried out using a cyclonic or centrifugal separator.

3. A method according to claim 1, wherein the mixture following its treatment using hydrodynamic cavitation and hydraulic shock is discharged into one or more separators via one or more venturis submerged within the separator.

4. A method according to claim 1, wherein the mixture is subjected to an electrical current to increase the effectiveness of coalescence of the hydrocarbon containing contaminant material.

5. A method according to claims 1, wherein gas is introduced into at least one separator as microbubbles, ultrafine bubbles or nanobubbles to enhance the effectiveness of coalescence of the hydrocarbon material.

6. A method according to claim 1, wherein the process water is heated to above ambient temperature.

7. A method according to claim 6, wherein the process water is heated to approximately 40-70C (approximately 315-350K) to aid separation of asphaltenes, weathered or oxidised bitumens and petroleum waxes from solid particulates.

8. A method according to claim 6, wherein one or more ionic salts are dissolved into the process water in order to increase the rates of coalescence of the hydrocarbon-contaminant material in one or more separators.

* * * * *